UNITED STATES PATENT OFFICE.

MYRTIL KAHN AND FRIEDRICH RUNKEL, OF ELBERFELD, GERMANY, ASSIGNORS TO THE FARBENFABRIKEN, VORMALS FR. BAYER & CO., OF SAME PLACE.

BLACK DYE.

SPECIFICATION forming part of Letters Patent No. 536,431, dated March 26, 1895.

Application filed January 2, 1895. Serial No. 533,634. (Specimens.)

*To all whom it may concern:*

Be it known that we, MYRTIL KAHN and FRIEDRICH RUNKEL, chemists, doctors of philosophy, subjects of the Emperor of Germany, residing at Elberfeld, Prussia, Germany, (assignors to the FARBENFABRIKEN, VORMALS FR. BAYER & CO., of Elberfeld, Prussia, Germany,) have invented a new and useful Improvement in the Manufacture of Black Azo Dye; and we do hereby declare the following to be an exact and full description of our invention.

Our invention relates to the production of a new substantive black azo dye, which consists in combining one molecular proportion of tetrazotised diamidodiphenylamin sulfo acid first with one molecular proportion of the so-called amidonaphtholmonosulfo acid G, re-diazotising the formed intermediate product and finally coupling the same with two molecular proportions of a meta diamin such as meta phenylenediamin or meta-toluylenediamin.

The aforesaid new diamidodiphenylamin monosulfo acid can be obtained by allowing a salt of chloronitro benzene sulfo acid (Cl: $SO_3H:NO_2 = 1:2:4$) to act on free para phenylenediamin in hot watery solution and in the presence of alkaline salts, which are decomposed by hydrochloric acid. The alkaline salts of the resulting para nitro para amido diphenylamin ortho sulfonic acid dissolve readily in water and the said sulfonic acid separates in small grayish-brown crystals, on adding mineral acids to the solution of its alkaline salts in water. The aforesaid para nitro para amidodiphenylamin ortho sulfo acid, now, is by reduction converted into the corresponding para diamidodiphenylamin ortho sulfo acid having the formula:

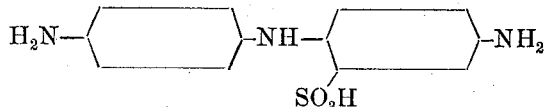

or

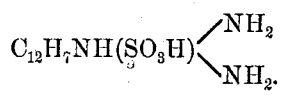

The reduction can be effected by means of methods known and in use for analogous purposes.

In order to produce the black azo dye we can, for example, proceed as follows: 2.79 parts, by weight, of diamidodiphenylamin monosulfo acid are dissolved in three hundred parts, by weight, of water with the addition of 5.4 parts, by weight, of hydrochloric acid (20° Baumé) and gradually mixed with 1.4 parts, by weight, of sodium nitrite dissolved in eight parts, by weight, of water, while the whole mixture is well cooled down by means of ice. Most practically the yellowish colored tetrazo solution is carefully alkalized by means of strong sodium carbonate solution until a test-paper shows a weak alkaline reaction, viz: until the yellowish colored solution is turned into an orange-red colored liquid. Into the thus obtained tetrazo-solution a mixture, prepared by dissolving 2.4 parts, by weight, of amidonaphthol sulfo acid G in thirty parts, by weight, of water with the addition of 0.6 parts by weight, of sodium carbonate, is poured immediately. After standing for about from one to two hours the formation of the so-called intermediate product is complete. The reaction mixture is acidulated by means of 7.2 parts, by weight, of hydrochloric acid, (20° Baumé,) and 0.8 parts, by weight, of sodium nitrite dissolved in four parts, by weight, of water are then added to the above acidulated mass. The rediazotisation of the intermediate product is complete after about ten hours while stirring. The so-formed tetrazo compound of the intermediate product being almost insoluble in water, is filtered off and washed by means of ice-water. The blackish precipitate, being the tetrazo-compound, is stirred into a solution obtained by dissolving 3.6 parts by weight, of meta phenylendiamin hydrochlorate in sixty parts, by weight of water, with the addition of an excess of sodium acetate. The formation of the dye-stuff is facilitated by well stirring the mixture during several hours and finally heating the same gradually at about from 30° to 60° centigrade. The mixture after being rendered alkaline by means of sodium carbonate is mixed with a suitable quantity of common salt, the dye-stuff being thus precipitated on cooling in dark flakes. It may be purified by redissolving in hot water and carefully salting out in the usual manner.

When filtered off, pressed, dried and pulverized the dye-stuff forms a brownish-black powder, easily soluble in water with a brownish-black color, which turns into reddish-brown when ammonia liquor is added to its watery solution.

The dye-stuff is almost insoluble in cold and hot alcohol as well as in strong soda-lye. By concentrated sulfuric acid (66° Baumé) it is dissolved with a bluish-black color which changes first into bluish-violet on the addition of a small quantity of ice-water to the sulfuric acid solution and then a brownish-black precipitate is formed, if the quantity of ice-water is increased.

The dye-stuff produces on unmordanted cotton deep black shades, and the resulting shades exhibit more than double the intensity which results from the use of the black cotton dyes hitherto known. The shades are also distinguished for their resistance to acids and alkalies. The dye-stuff has the following formula:

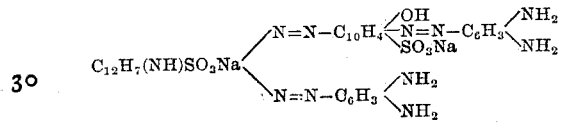

Having now described our invention and in what manner the same is to be performed, what we claim as new, and desire to secure by Letters Patent, is—

1. The process for the production of black dye which consists in combining one molecular proportion of tetrazotised diamidodiphenylamin sulfo acid first with one molecular proportion of amidonaphtolsulfo acid G in an alkaline solution rediazotising the resulting intermediate product in the well-known manner and finally combining the so-formed tetrazocompound with two molecular proportions of a meta diamin such as meta phenylendiamin or meta toluylendiamin in an acetic acid solution.

2. As a new article of manufacture the black azo dye which may result from combining one molecular proportion of tetrazotised diamidodiphenylamin monosulfo acid, one molecular proportion of amidonaphtolsulfo-acid G and two molecular proportions of a meta diamin such as meta phenylenediamin or meta toluylenediamin in the manner hereinbefore described, having when meta phenylenediamin is employed, the formula:

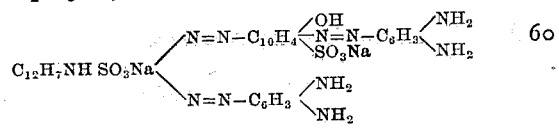

forming a brownish-black powder, easily soluble in water with a brownish-black color, insoluble in alcohol and strong soda-lye, soluble in concentrated sulfuric acid (66° Baumé) with a bluish-black color, which turns into bluish-violet on the addition of a small quantity of ice-water, while a brownish-black precipitate is obtained, when the above sulfuric acid solution is mixed with a large quantity of ice-water producing on unmordanted cotton deep black shades of great intensity and fastness to the action of alkali and acid.

In testimony whereof we have signed our names in the presence of two subscribing witnesses.

MYRTIL KAHN.
FRIEDRICH RUNKEL.

Witnesses:
R. E. JAHN,
F. H. STRAUSS.